UNITED STATES PATENT OFFICE.

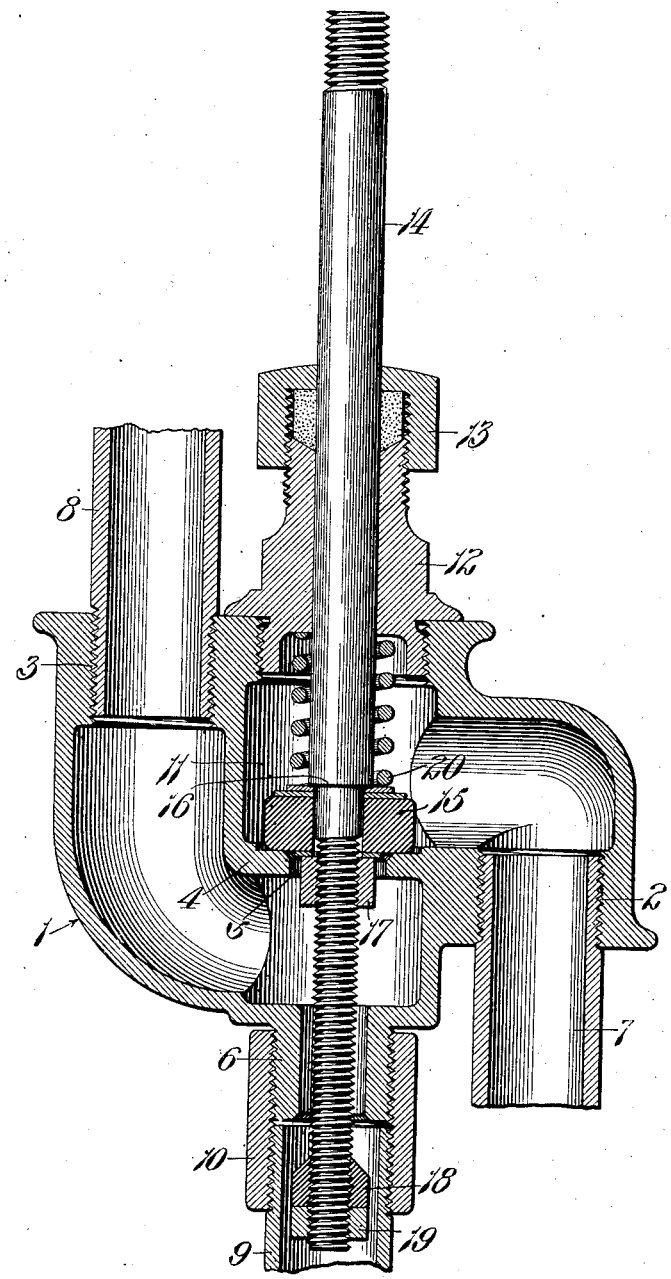

CHARLES G. WOODS, OF ST. LOUIS, MISSOURI, ASSIGNOR, BY DIRECT AND MESNE ASSIGNMENTS, OF ONE-FOURTH TO FRANK GRUTZNER, ONE-FOURTH TO GUY HAYNES, AND ONE-FOURTH TO JOSEPH H. BROGAN, ALL OF ST. LOUIS, MISSOURI.

VALVE.

1,049,793.  Specification of Letters Patent. Patented Jan. 7, 1913.

Application filed December 12, 1910. Serial No. 596,820.

*To all whom it may concern:*

Be it known that I, CHARLES G. WOODS, a citizen of the United States, and resident of St. Louis, Missouri, have invented certain new and useful Improvements in Valves, of which the following is a specification containing a full, clear, and exact description, reference being had to the accompany drawings, forming a part hereof.

My invention relates to improvements in valves, the object of my invention being to construct a three-way valve having a pair of oppositely facing valve seats, and to arrange within the valve housing for coaction with said valve seats a pair of valves on a common stem, the valves being in such relation to each other and to the valve seats that one of the valves will rest against one of the valve seats and the other valve be removed from the other valve seat. Such a valve is primarily intended for use in connection with house plumbing and is applied generally to the water service pipe, there being a water supply pipe connected with the valve housing, a service pipe connected with the valve housing, and a valve within the housing controlling the communication between the supply pipe and the service pipe, and a drain pipe connected with the housing and in communication with the service pipe, there being a valve controlling the communication between the drain pipe and the service pipe whereby, when it is desired to drain the service pipe, as for instance to prevent freezing of the pipe, the supply pipe is cut off and the drain pipe opened.

With the above purposes in view, my invention consists in certain novel features of construction and arrangement of parts as will be hereinafter more fully described, pointed out in the claim and illustrated by the accompanying drawing.

In the drawing the figure is a vertical sectional elevation of the complete valve showing portions of the supply pipe, the service pipe and the drain pipe.

Referring by numerals to the accompanying drawing: 1 designates the valve housing having an internally screw threaded inlet 2, an internally screw threaded outlet 3, a partition 4, between the inlet and outlet, having a port 5 therethrough. Formed integrally with the housing alining with the port 5 and projecting from the housing 1 is an externally threaded tubular extension 6, all of which parts are preferably formed in one piece.

7 designates the water supply pipe, which is secured in the inlet 2, 8 designates the service pipe secured to the outlet 3 and 9 the waste pipe which is secured to the tubular extension 6 by means of the coupling 10.

Formed within the housing above the partition 4 is a chamber 11, the upper portion of which is internally threaded to receive the sleeve nut 12, the upper portion of the nut being threaded to receive the packing nut 13 through which nuts the stem 14 operates the lowermost end of which is reduced and threaded. Carried by the stem 14 and at the uppermost end of the reduced lower portion is a disk-shaped valve 15 which is of a size and shape to close the port 5, the valve 15 being held in position between the shoulder 16 and the retaining nut 17.

18 designates a cone valve carried by the stem 14 adjacent the lower end of the threaded portion and which is held in position by a retaining nut 19.

The seat for the valve 15 is a flat seat and the seat for the valve 18 is formed by chamfering the lower extremity of the tubular extension 6.

Arranged within the chamber 11 embracing the stem 14 and impinging between the valve 15 and the lower end of the sleeve nut 12 is an extensile coil spring 20 which is arranged to normally hold the valve 15 in a closed position and the valve 18 in an open position.

In connection with the valve there is employed a means (not shown) connected with the upper screw threaded end of the stem 14, which means holds the valve 15 in a position removed from the port 5, and the valve 18 in a closed position seated in the lower end of the tubular extension 6.

I am aware that it is common to provide a single valve stem with two valves, but so far as I know these valves are all arranged to either be seated at the same time or open at the same time. Such a valve could not be used for the same purpose as I contemplate using my valve.

In the practical operation of my valve, assuming the pipe 7 is connected with a source of water supply, the pipe 8 leading to service cocks and the pipe 9 connected with a drain or sewer pipe and the parts of the valve being in the position shown in the drawing, it is obvious that the water supply is cut off from the service pipe by the valve 15 and that the service pipe 8 will be drained for the reason that the valve 18 is open. In this connection in order that the draining of the service pipe 8 be facilitated the service cock should be opened in order to admit air to the pipe. When it is desired to again establish communication between the supply pipe 7 and service pipe 8 and cut off communication with the drain pipe 9, the stem 14 is elevated against the pressure of the spring 20 and held in such position as long as it is desired to maintain a communication between the supply and service pipes.

The valve as a whole is preferably located within the cellar, basement or some other convenient point not subject to freezing temperature, and the valve may be operated from a remote point by rods or cables as, for instance, in a dwelling the remote point being on one of the living floors of the dwelling so that the operator need not go to the valve, but may operate it from a distant point.

In the event it is necessary to employ cables and direction pulleys for the operation of the valve the spring 20 actuates the valves 15 and 18 to close the communication between the supply and service pipes and open communication between the service pipe and the drain pipe. Normally, that is when it is desired to establish communication between the supply and service pipes, the valve 15 is in an open position and the valve 18 shuts off the drain pipe.

I claim:

In a valve of the class described, a housing inclosing a chamber, an integral perforated partition dividing said chamber, integral oppositely extended elbows in communication with said chamber, one on either side of said partition, each elbow having one wall in common with the housing, an integral tubular extension having a valve seat at its end leading from the chamber, a bonnet secured to the housing opposite the tubular extension, a valve stem extended through the chamber, bonnet and tubular extension, a pair of adjustable valves on said stem, one arranged to control the opening in the partition in the chamber and the other to control the outlet from the tubular extension, and a spring acting on said stem, substantially as shown and for the purposes stated.

In testimony whereof I have signed my name to this specification in presence of two subscribing witnesses.

CHARLES G. WOODS.

Witnesses:
 N. G. BUTLER,
 E. L. WALLACE.

---

Copies of this patent may be obtained for five cents each, by addressing the "Commissioner of Patents, Washington, D. C."